(12) United States Patent
Burke et al.

(10) Patent No.: US 8,613,493 B1
(45) Date of Patent: Dec. 24, 2013

(54) POSITIONING A MOBILE APPARATUS FOR ADJACENT PRINTING SWATHS

(71) Applicants: Gregory Michael Burke, Escondido, CA (US); Gary Alan Kneezel, Webster, NY (US)

(72) Inventors: Gregory Michael Burke, Escondido, CA (US); Gary Alan Kneezel, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/749,734

(22) Filed: Jan. 25, 2013

(51) Int. Cl.
*B41J 29/393* (2006.01)

(52) U.S. Cl.
USPC .............................. 347/19; 347/41

(58) Field of Classification Search
USPC .......................... 347/12, 15, 41, 19
See application file for complete search history.

(56) References Cited

U.S. PATENT DOCUMENTS

| 6,386,668 | B1 * | 5/2002 | Shimizu et al. | 347/13 |
| 6,726,303 | B2 * | 4/2004 | Otsuki | 347/19 |
| 7,377,613 | B2 * | 5/2008 | Yamazaki et al. | 347/19 |

* cited by examiner

*Primary Examiner* — Lamson Nguyen
(74) *Attorney, Agent, or Firm* — Peyton C. Watkins

(57) ABSTRACT

A method of printing with a mobile printing apparatus having an array of marking elements, the method includes moving the mobile printing apparatus to an initial starting position; providing a first swath of data; printing a first printed swath corresponding to the first swath of data using a first portion of the array of marking elements while moving the mobile printing apparatus along a scan direction; printing a first set of position reference marks using a second portion of the array of marking elements while moving the mobile printing apparatus along the scan direction; providing a second swath of data; sensing the first set of position reference marks; and printing a second printed swath corresponding to the second swath of data, wherein operation of the mobile printing apparatus for printing the second printed swath is guided, at least in part, by the first set of position reference marks.

19 Claims, 8 Drawing Sheets

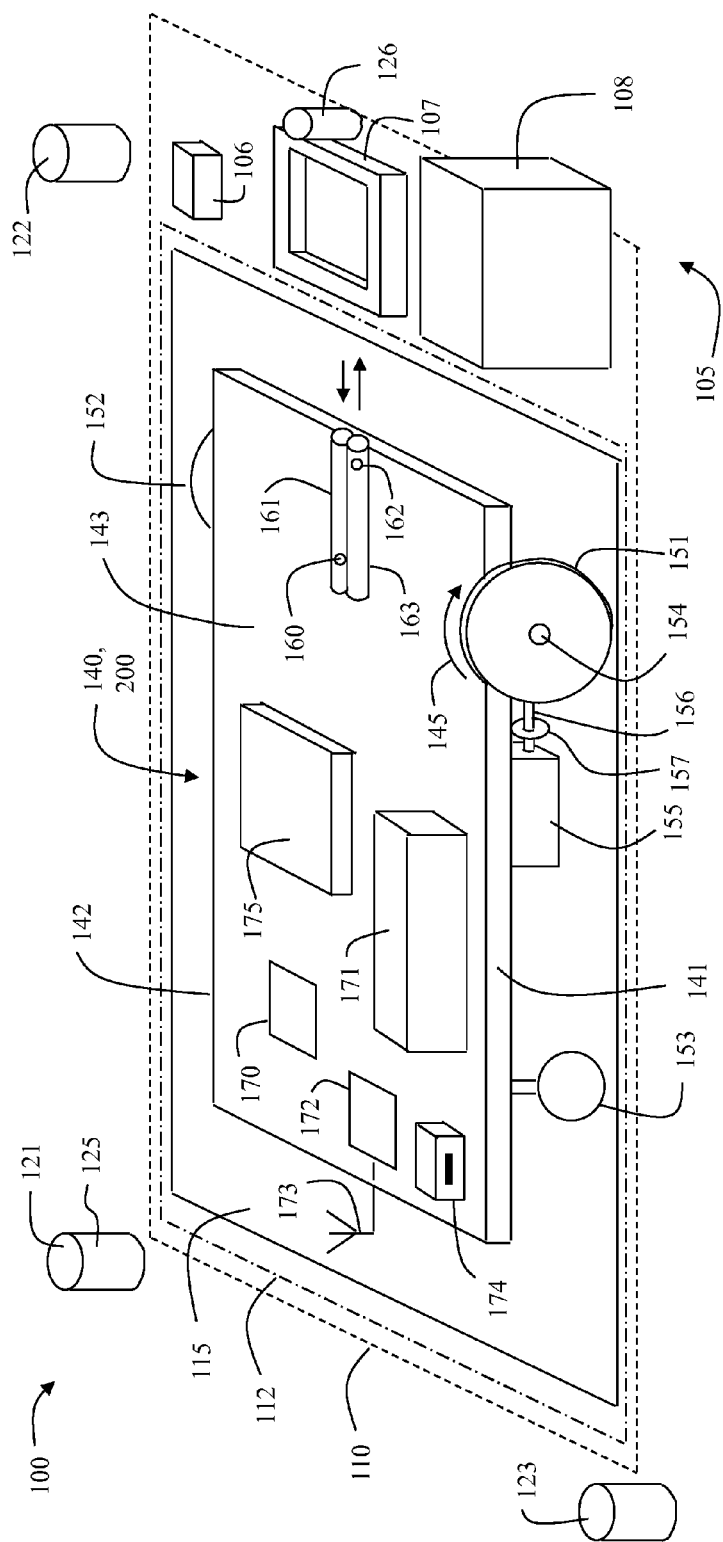
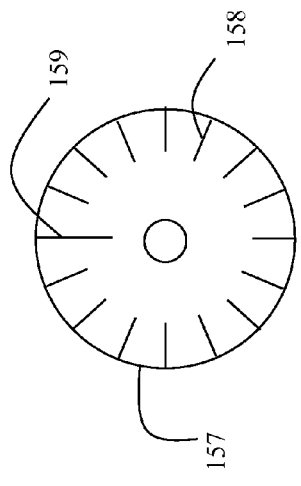
FIG. 1
FIG. 2

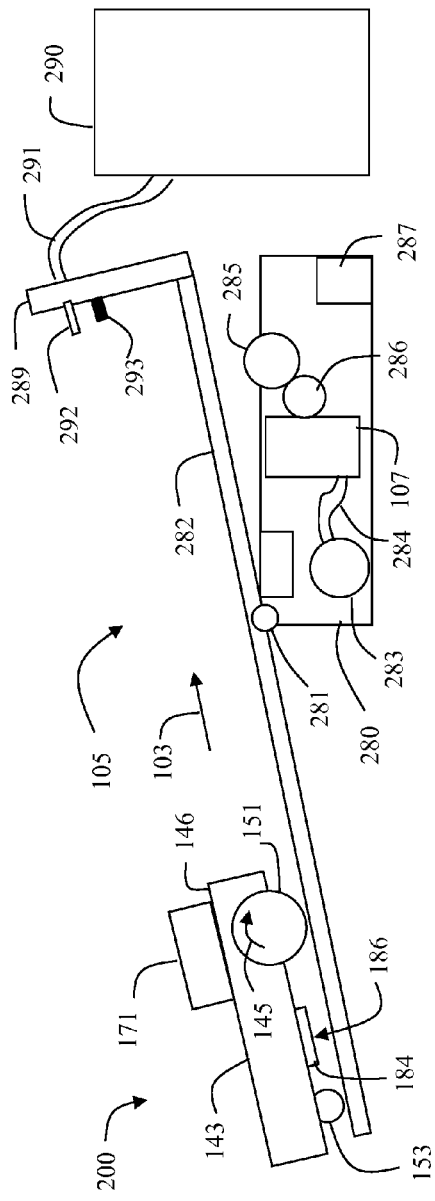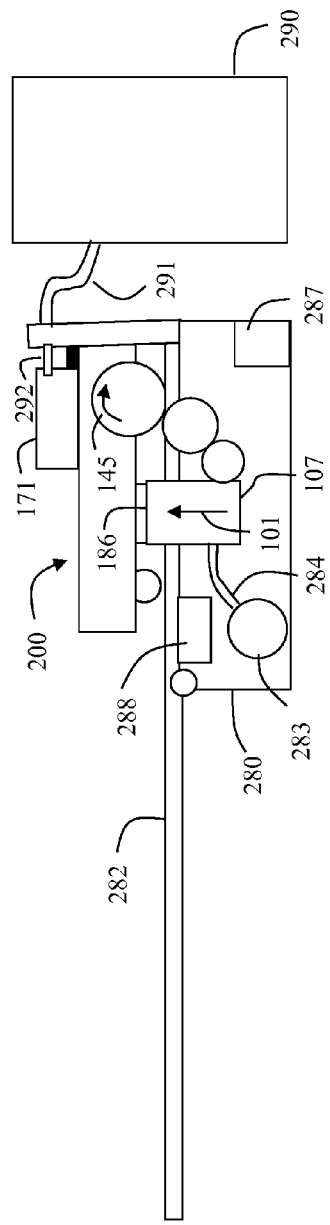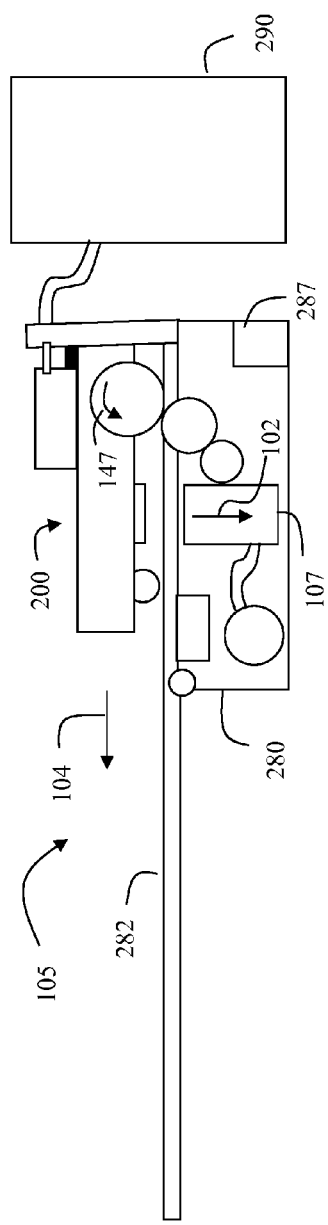

POSITIONING A MOBILE APPARATUS FOR ADJACENT PRINTING SWATHS

CROSS REFERENCE TO RELATED APPLICATIONS

Reference is made to commonly assigned, U.S. patent application Ser. No. 13/749,733, filed Jan. 25, 2013, entitled "Mobile Printing and Printed Reference Marks" by Greg Burke, and U.S. patent application Ser. No. 13/749,736, filed Jan. 25, 2013, entitled "Home Base for a Mobile Printing Apparatus" by Greg Burke and Gary Kneezel, the disclosures of which are herein incorporated by reference.

FIELD OF THE INVENTION

The present invention relates generally to the field of motion-controlled mobile printing units, and more particularly to a mobile printing apparatus that is capable of relatively positioning adjacent printed swaths at high accuracy.

BACKGROUND OF THE INVENTION

A mobile apparatus can be controlled to perform an operation as a function of a position of the mobile apparatus. An example of such an operation is ejecting a liquid onto a medium for printing an image or fabricating a device. The accuracy to which the position of the mobile printing apparatus must be known depends at least in part upon what is being printed and the quality of the resulting output that is required. For example, the print quality of a sign that is to be viewed at a long distance does not require as high a degree of positional accuracy of printing as does a poster-sized print of a photographic image. In addition, the placement of different portions of an image that are separated by white space is not as critical as the placement of different portions of an image that are adjacent to each other and printed on separate printing swaths. With regard to functional printing for fabricating a device, the alignment of adjacent swaths for the printing the device in multiple passes can affect the performance of the resulting device.

Commonly assigned, co-pending U.S. patent application Ser. No. 13/686,986 filed Nov. 28, 2012, entitled "Mobile Apparatus with Local Position Referencing Elements" by Greg Burke; co-pending U.S. patent application Ser. No. 13/686,992 filed Nov. 28, 2012, entitled "Method of Positioning a Mobile Apparatus" by Greg Burke; co-pendingU.S. patent application Ser. No. 13/686,998 filed Nov. 28, 2012, entitled "Mobile Apparatus with Local Position Referencing Structure" by Greg Burke; and co-pending U.S. patent application Ser. No. (13/687,008 filed Nov. 28, 2012, entitled "Determining a Position of a Mobile Apparatus" by Greg Burke and Gary Kneezel, the disclosures of which are herein incorporated by reference, disclose local positioning references for a mobile apparatus. Some of such local positioning references can have an accuracy of a few thousandths of an inch. Such accuracy is sufficient for placement of different portions of an image that are separated by white space. However, for printing of adjacent swaths of an image at high image quality, an accuracy of approximately one thousandth of an inch can be required.

Therefore, a need exists for a more accurate way of determining the position of a mobile printing apparatus for printing an image or other item in multiple passes, such that adjacent printed swaths are aligned without a readily perceptible effect due to misalignment. A need also exists for a mobile printing system that provides maintenance and preferably also replenishment for the mobile printing apparatus.

SUMMARY OF THE INVENTION

The present invention is directed to overcoming one or more of the problems set forth above. Briefly summarized, according to one aspect of the invention, the invention resides in a method of printing with a mobile printing apparatus having an array of marking elements disposed along an array direction, the method includes moving the mobile printing apparatus to an initial starting position; providing a first swath of data; printing a first printed swath corresponding to the first swath of data using a first portion of the array of marking elements while moving the mobile printing apparatus along a scan direction; printing a first set of position reference marks using a second portion of the array of marking elements while moving the mobile printing apparatus along the scan direction; providing a second swath of data; sensing the first set of position reference marks; and printing a second printed swath corresponding to the second swath of data, wherein operation of the mobile printing apparatus for printing the second printed swath is guided, at least in part, by the first set of position reference marks.

BRIEF DESCRIPTION OF THE DRAWINGS

In the detailed description of the preferred embodiments of the invention presented below, reference is made to the accompanying drawings, in which:

FIG. 1 schematically shows a position-referenced mobile printing system with a mobile printing apparatus;

FIG. 2 schematically shows a rotary encoder;

FIGS. 4A, 4B and 4C show a sequence of operations as the mobile printing apparatus enters a docking station for maintenance and replenishment;

DETAILED DESCRIPTION OF THE INVENTION

Figure 3:
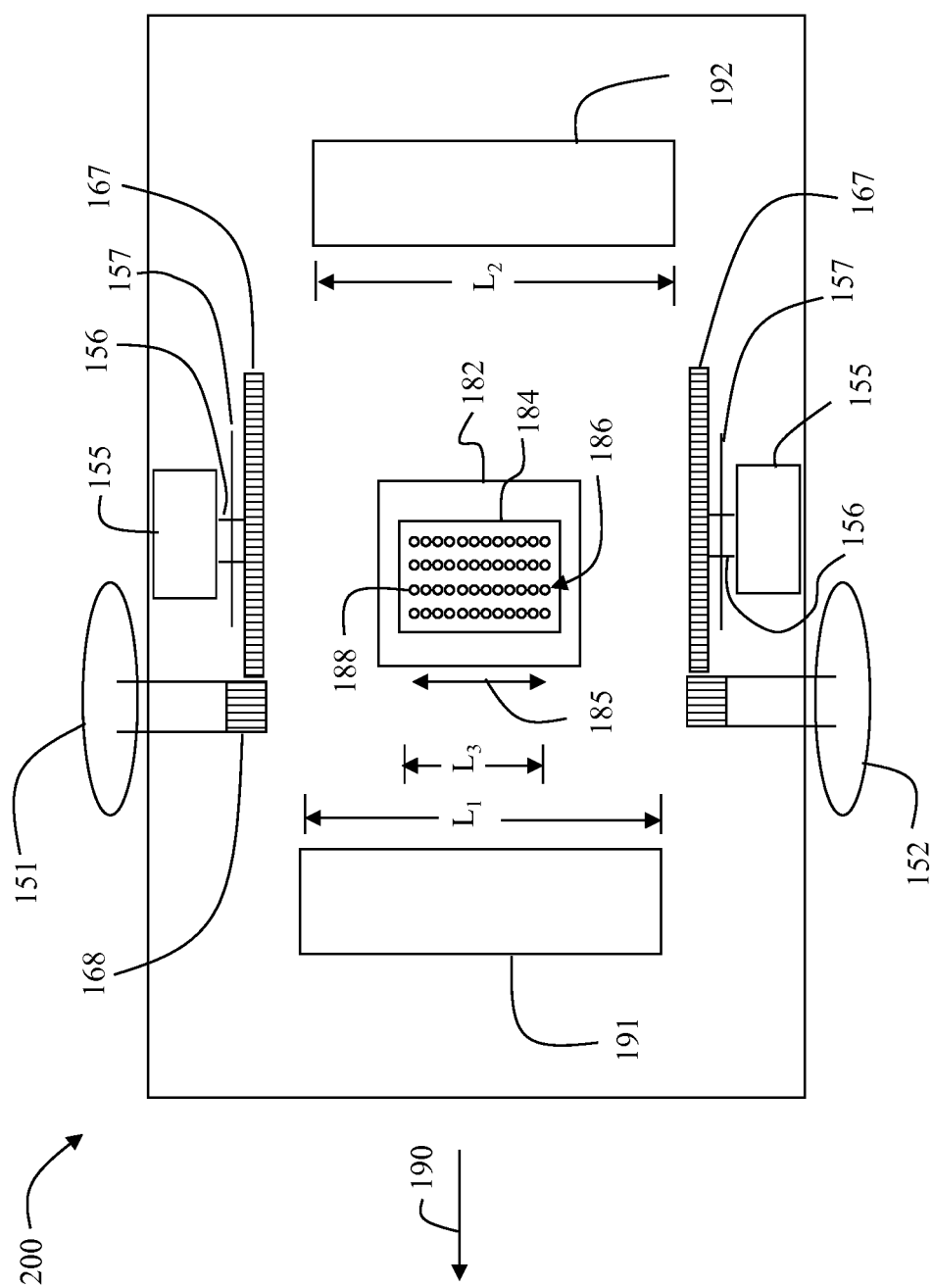
FIG. 3 shows a bottom view of the mobile printing apparatus including a printhead for printing as a function of position of the mobile printing apparatus.

The present description will be directed in particular to elements forming part of, or cooperating more directly with, an apparatus in accordance with the present invention. It is to be understood that elements not specifically shown or described may take various forms well known to those skilled in the art. It is also noted that the drawings are not to scale.

FIG. 1 schematically shows a position-referenced mobile printing system 100, similar to that described in co-pending U.S. patent application Ser. No. 13/686,986 filed Nov. 28, 2012, entitled "Mobile Apparatus with Local Position Referencing Elements" and is an example of system that can incorporate embodiments of the invention, as described below. The position referenced mobile printing system 100 includes a mobile apparatus 140, a controller 170 and a plurality of reflective elements 121, 122 and 123. The mobile apparatus 140 is located in a printing region 112 within a position detection region 110. The printing region 112 can include a sheet of medium 115 lying flat on a horizontal table or floor for example. As described below, the mobile apparatus 140 including a printhead 182 (see FIG. 3) will be called a mobile printing apparatus 200 herein. The mobile apparatus 140 is shown artificially large compared to the position detection region 110 so that details of the mobile apparatus 140 can be seen more clearly. A typical length of the mobile apparatus 140 can be around several inches, while a typical length and width of the position detection region 110 can be around several feet.

The mobile apparatus 140 includes a chassis 143 having a first edge 141 and a second edge 142 that is opposite the first edge 141. A first wheel 151 is rotatably mounted near the first edge 141 and a second wheel 152 is rotatably mounted near the second edge 142. A first motor 155 provides power to rotate the first wheel 151 about a hub 154. A second motor, which is not visible in FIG. 1, but is shown in FIG. 3, will also be referred to as reference numeral 155 for convenience in this description. The second motor 155 provides power to rotate the second wheel 152 independently of the first wheel 151. Both the first wheel 151 and the second wheel 152 can be independently driven by their respective motors 155 in a first rotational direction 145 (forward) or in a second rotational direction 147 (reverse) opposite the first rotational direction 145. Driving the first wheel 151 in the first rotational direction 145 while also driving the second wheel 152 in the first rotational direction causes the mobile apparatus 140 to move from one location to a different location. Driving the first wheel 151 in the first rotational direction 145 while driving the second wheel 152 in a second rotational direction 147 that is opposite the opposite rotational direction causes the mobile apparatus 140 to rotate to a different orientation. At least one freely rotating ball or caster wheel 153 helps to support chassis 143 and is able to turn in any direction as required by movement of the driven first and second wheels 151 and 152. The freely rotating ball or caster wheel 153 is shown in FIG. 1 as being near the first edge 141. There can also be another freely rotating ball or caster wheel (not shown) near the edge 142. In other embodiments, a freely rotating ball or caster wheel (not shown) can be more centrally disposed between the first edge 141 and the second edge 142.

A first rotary encoder 157 (FIG. 2) is mounted on a shaft 156 of the first motor 155 in order to monitor an amount of rotation of the first motor 155 and the first wheel 151. Optionally the rotary encoder 157 can be mounted on an axle of the first wheel 151 rather than on the shaft 156. In either case the intent is to monitor an amount of rotation of the first wheel 151. The rotary encoder 157 typically includes an optical sensor (not shown) and a plurality of radial lines 158 disposed around a circumference of a disk. The optical sensor not shown) detects rotation of the disk by high signals corresponding to light passing through transparent regions of the disk or low signals corresponding to light being blocked by the radial lines 158. For simplicity in FIG. 2, the lines 158 are shown as being spaced about every 22.5 degrees. In actual rotary encoders, the lines are typically spaced about every degree. The rotary encoder 157 typically includes a detectable reference position 159. In the configuration shown in FIG. 2, the detectable reference position 159 is shown as an elongated radial line 158. A second rotary encoder 157 is provided to monitor an amount of rotation of the second motor 155 and the second wheel 152. The first and second rotary encoders 157 are monitored while driving the first wheel 151 and the second wheel 152 in the same rotational direction (and knowing the diameters of the wheels) to permit the calculation of a distance moved by the mobile apparatus 140. The first and second rotary encoders 157 are monitored while driving the first wheel 151 and the second wheel 152 in opposite rotational directions (and knowing a distance between the wheels) to permit the calculation of an amount of rotation by the mobile apparatus 140.

At least one photo detector 160 and a laser 162 are also mounted on the chassis 143. In the configuration shown in FIG. 1, the photo detector 160 is disposed within a hollow tube 161, and the laser 162 includes a cylindrical package 163. The hollow tube 161 is parallel to the cylindrical package 163 and is adjacent to it. It is not required that the laser 162 have the cylindrical package 163, but such a package shape can be helpful in aligning the laser 162 such that its beam is emitted substantially parallel to the hollow tube 161. The hollow tube 161 is opaque in order to reduce the amount of stray light impinging on the photo detector 160, so that primarily the light received by the photo detector 160 is light from the laser 162 that is reflected from a reflective surface. A typical diameter of the hollow tube 161 and of the emitted beam from the laser 162 is about 3 millimeters. In the schematic view of FIG. 1, the hollow tube 161 and the cylindrical package 163 are shown as transparent so that the photo detector 160 and the laser 162 can be indicated. The controller 170, which in the embodiment shown in FIG. 1 is mounted on the mobile apparatus 140, interprets electrical signals provided by the photo detector 160 and makes calculations to determine the position of the mobile apparatus 140. The controller 170 also interprets signals from the rotary encoders 157, sends signals for the motors 155 for moving or rotating the mobile apparatus 140, and provides overall control of the operation of the mobile apparatus 140. A power source 175, such as a battery, is also mounted on the mobile apparatus 140 and provides power for the motors 155, the controller 170, the laser 162, and other devices associated with the operation of the mobile apparatus 140.

In the configuration shown in FIG. 1, the reflective elements 121, 122 and 123 are shown as being positioned at locations that are near to but outside of the position detection region 110. The reflective elements 121, 122 and 123 are observable by the photo detector 160 when the mobile apparatus 140 is located within the position detection region 110. However, a strong light signal will only be detected by the photo detector 160 when the laser 162 and the hollow tube 161 are pointed toward one of the reflective elements 121, 122 or 123. Optionally, a color filter (not shown) can be included in front of the photo detector 160 in order to filter out wavelengths that do not correspond to the laser 162. In a preferred embodiment, a reflective surface of at least one reflective element 121 is cylindrical. An advantage of a reflective cylindrical surface 125 is that as the orientation of the hollow tube 161 and the laser 162 changes, for example, as the mobile apparatus 140 is rotated, a strong light signal will be detected by the photo detector 160 over a very small range of angles where the incident and reflected laser beam are substantially perpendicular to the cylindrical surface 125. Light reflecting from the surface of the cylinder along a direction that can be received into the hollow tube 161 is in the direction of a vector passing through the center of the cylinder, so that the radius of the cylinder is not important. The reflected laser beam has a narrow width so that errors resulting from beam width are small. Detecting an amplitude of light includes analyzing a signal from the photo detector 160 (corresponding to reflected laser light) as a function of the orientation of the hollow tube 161. Other examples of position referenced mobile systems that can be used with embodiments of the present invention are described in co-pending U.S. patent application Ser. No. 13/686,998, filed Nov. 28, 2012, entitled "Mobile Apparatus with Local Position Referencing Structure", and can include a reflective linear reference member (not shown), as well as two reflective cylindrical surfaces, such as the cylindrical surfaces 125 of reflective elements 121 and 122. Position referenced mobile systems, such as those described in co-pending U.S. patent application Ser. Nos. 13/686,986, filed Nov. 28, 2012 and 13/686,998, filed Nov. 28, 2012. can provide a position accuracy of the mobile apparatus 140 of a few thousandths of an inch. Some systems, such as the system described in U.S. patent application Ser. No. 13/686,998, having a plurality of reference markings on the reflective linear reference member (not shown) can provide an even better position accuracy.

Embodiments of the present invention provide a degree of relative alignment of adjacent swaths printed by the mobile apparatus 140 such that any misalignment between adjacent swaths is not readily perceptible. The mobile apparatus 140 can be controlled to perform an operation as a function of a position of the mobile apparatus 140. An example of such an operation is ejecting drops of liquid onto a medium for printing an image or fabricating a device. Whether the liquid ejected includes a colorant and the operation results in a printed image, or the liquid includes a functional material and the operation results in a fabricated device, the mobile apparatus 140 will be called the mobile printing apparatus 200 (FIG. 3) herein. The mobile printing apparatus 200 includes the elements described above for the mobile apparatus 140 with reference to FIG. 1, as well as at least one marking device, such as the printhead 182.

A bottom schematic of the mobile printing apparatus 200 is shown in FIG. 3. The first wheel 151 and the second wheel 152 are shown with their respective wheel gears 168. The first motor 155 drives the first wheel 151 via a motor gear 167 that engages the wheel gear 168. The rotary encoder 157 disposed on the shaft 156 monitors the amount of wheel rotation by measuring the amount of motor rotation. Similarly, the second motor 155 drives the second wheel 152 via a motor gear 167 that engages the wheel gear 168. The rotary encoder 157 disposed on the shaft 156 monitors the amount of wheel rotation by measuring the amount of motor rotation. The first and second wheels 151 and 152 can therefore be driven and monitored independently of each other. The printhead 182 is shown in FIG. 3 and includes a printhead die 184 containing an array of marking elements 186. In a preferred embodiment, array of the marking elements 186 includes an array of nozzles 188 for ejecting drops of liquid as directed by the controller 170 (FIG. 1) as a function of detected position of mobile printing apparatus 200. The drops of liquid can include colored inks, such that ejecting at least one drop of liquid based on location of the mobile printing apparatus 200 includes printing a portion of an image on a sheet of the medium 115 (FIG. 1) with which the first and second wheels 151 and 152 are in contact. In the example of FIG. 3, four linear arrays of marking elements 186 are disposed along an array direction 185, for example for ejecting cyan, magenta, yellow and black ink respectively. Alternatively the drops of liquid can include solutions including a functional material such as conductive particles, resistive particles, insulating particles, semiconducting particles or magnetic particles for functional printing as based on location of mobile printing apparatus 200 in order to fabricate a device according to control signals by controller 170 (FIG. 1).

Also shown in FIG. 3 are a first photosensor array 191 and an optional second photosensor array 192 for detecting printed position reference marks as described below. As described below, only the first photosensor array 191 is required if printing is only done while moving the mobile printing apparatus 200 in a direction 190 such as first printing direction 195 so that the first photosensor array 191 leads the array of marking elements 186. For the mobile printing apparatus 200 such that printing can be done also when the first photosensor array 191 trails the array of marking elements 186, then the second photosensor array 192 is required as shown in FIG. 3 so that a photosensor array is always leading the array of marking elements 186 during printing. The first photosensor array 191 or the second photosensor array 192 can also be used to detect an edge of the sheet of the medium 115 in order to properly position the image or device relative to sheet of the medium 115. The photosensor arrays 191 and 192 can also provide feedback about previously marked regions of sheet of the medium 115. Optionally, one or more light sources (not shown) can be provided near the photosensor arrays 191 and 192 in order to illuminate the sheet of the medium 115. The first photosensor array 191 has a first length $L_1$; the second photosensor array 192 (if present) has a second length $L_2$; and the array of marking elements 186 has a third length $L_3$ that is less than both the first length $L_1$ and the second length $L_2$. In a preferred embodiment, which is described in further detail below, $L_1$ is equal to or approximately equal to three times the length $L_3$ of the array of marking elements 186. If the second photosensor array 192 is present, the first length $L_1$ is preferably equal to second length $L_2$. For example, the first and second photosensor arrays 191 and 192 can be three inch long linear arrays of photo sensing elements that are disposed at 600 photo sensing elements per inch, and the array of marking elements 186 can be a one inch long array. The array of marking elements 186 is located near the first photosensor array 191 and is preferably located between the first photosensor array 191 and the second photosensor array 192 if the optional second photosensor array 192 is present.

With reference again to FIG. 1, additional components of the mobile printing system 100 and the mobile printing apparatus 200 will be described next. At least one liquid supply 171 is provided on the chassis 143 for providing liquid to the printhead 182 (FIG. 3). A home base 105 can be provided, for example, at a location that is near to but outside of the printing region 112. The mobile printing apparatus 200 can move to the home base 105 between printing jobs, or on an as needed basis for replenishment or maintenance. In order for the mobile printing apparatus 200 to locate the position of the home base 105, a position reference element such as a reflective cylinder 126 can be disposed at or near the home base 105. Alternatively, coordinates of the home base 105 can be stored in memory that is part of the controller 170. The home base 105 can include a cap 107 for isolating the array of nozzles 188 from ambient. The home base 105 can also include other maintenance functions for the printhead 182, such as a wiper (not shown) or a pump 283 (FIG. 4B). In addition, the home base 105 can include a liquid refill station 108 for refilling the liquid supply 171 as needed and a charger 106 for recharging power source 175 as needed.

FIGS. 4A, 4B and 4C show the mobile printing apparatus 200 together with the home base 105 that includes a docking station 280, a ramp 282 that is pivotably attached to the docking station 280 by a hinge 281, and a replenishment station 290 that is located near the docking station 280. A flexible link 291 connects replenishment station 290 and a stop portion 289 of the ramp 282. The replenishment station 290 can be either or both the liquid refill station 108 (FIG. 1) or the charger 106 (FIG. 1) for example. Similarly, the flexible link 291 can include flexible tubing for transporting liquid (e.g. by pumping or by gravity) between the liquid refill station 108 and the stop portion 289. The flexible link 291 can also include flexible wiring for providing electrical power from the charger 106. A connector 292 is provided on the stop portion 289 for connecting to the mobile printing apparatus 200. In addition to providing electrical connection between the mobile apparatus 200 and the replenishment station 290, the connector 292 can also provide electrical connection between the mobile apparatus 200 and the docking station 280. Optionally, such electrical connection can permit the controller 170 to control the operation of the docking station 280. A locking mechanism can also be provided for securing the mobile printing apparatus 200 in a docked position as in FIG. 4B. A locking mechanism is shown schematically as a projection 293, which extends from the stop portion 289 and extends over a top edge 146 of the mobile printing apparatus 200 when docked as shown in FIG. 4B. The locking mechanism can also include a portion (not shown) that holds the ramp 282 in contact with the top of the docking station 280. The docking station 280 includes the raisable and lowerable cap 107 and the pump 283 that is connected to the cap 107 by a flexible tubing 284. Optionally, the docking station 280 includes a rotatable element 285 and an idler 286 for moving the cap 107 up and down as shown in FIGS. 4B and 4C respectively, and for providing power to the pump 283 by a power transmission (not shown) when the first wheel 151 is rotating in the first rotational direction 145 and is in contact with the rotatable element 285. The rotatable element 285 can include a wheel or a gear. Likewise, the idler 286 can include a wheel or a gear. Alternatively, the docking station 280 can include a motor 287 for providing power to raise and lower the cap 107 and to operate the pump 283. In such embodiments the rotatable element 285 is not required, and the idler 286 becomes a gear (for example) that is part of a power transmission (other elements of which are not shown).

As shown in FIG. 4A, the mobile printing apparatus 200 moves up the ramp 282 along an entry direction 103 with the first wheel 151 rotating in the first rotational direction 145. As the mobile printing apparatus 200 passes the hinge 281, the weight of the mobile printing apparatus 200 causes the ramp 282 to lower onto the docking station 280. The mobile printing apparatus 200 continues to move forward toward the stop portion 289 until the connector 292 is engaged, for example with the liquid supply 171 and/or electrical contacts (not shown) leading to the power source 175 or the controller 170 (see FIG. 1). The top edge 146 of mobile printing apparatus 200 moves under the projection 293. In FIG. 4A, the cap 107 is in its lowered position so that it does not interfere with motion of the mobile printing apparatus 200. In FIG. 4B the cap 107 is raised along a cap-raising direction 101 and extends through a slot (not shown) in the ramp 282 so that the cap 107 sealingly surrounds the array of marking elements 186 on the printhead die 184. For embodiments where power for raising the cap 107 is provided by the motion of the first wheel 151, the rotatable element 285 extends through a slot (not shown) in the ramp 282 for contact with the first wheel 151. In the example shown in FIGS. 4A and 4B, as the first wheel 151 moves in the first rotational direction 145 (clockwise), a rotatable element 285 rotates counterclockwise, and the idler 286 rotates clockwise to move the cap 107 in the cap-raising direction 101 via a rack and pinion action. With the cap 107 sealingly surrounding the array of marking elements 186, the pump 283 can be activated to apply a suction through the flexible tubing 284 to the cap 107 for pulling liquid through the nozzles 188 (see FIG. 1).

While the mobile printing apparatus 200 is docked at the docking station 280, liquid can be transferred from the liquid refill station 108 (see FIG. 1) to the liquid supply 171, and the battery of the power source 175 (FIG. 1) can be charged by the charger 106. In some embodiments, the liquid supply 171 is a replaceable tank. When the tank needs to be replaced, the mobile printing apparatus 200 moves to the docking station 280 and a tank replacement message can be displayed on a display 288.

When maintenance and replenishment operations have been completed at the docking station 280 and a pending printing job needs to be resumed or a new printing job needs to be started, the cap 107 is lowered along the cap-lowering direction 102, for example as the first wheel 151 is rotated in a second rotational direction 147 (counterclockwise) as in FIG. 4C. In order to disconnect the mobile printing apparatus 200 from the connector 292, the second wheel 152 (FIG. 1), which is in contact with the ramp 282, can be rotated in the second rotational direction 147. Once the first wheel 151 is disengaged from the rotatable element 285, both the first and second wheels 151 and 152 can be rotated in the second rotation direction 147 to move the mobile printing apparatus 200 in an exit direction 104 to leave the home base 105. After the mobile printing apparatus 200 passes the hinge 281, the ramp 282 tilts down for exit, similar to the position shown in FIG. 4A. The mobile printing apparatus 200 can then find a known coordinate of a starting point or point of resumption of a printing job using position references such as the reflective elements 121, 122 and 123.

In the example shown in FIG. 1, the controller 170 for controlling operations including printing is mounted on the mobile printing apparatus 200. However, in some embodiments (not shown) at least a portion of the control circuitry can be located remotely from the mobile printing apparatus 200. For example, such control circuitry can be located at the home base 105. For such embodiments, the mobile printing apparatus 200 can include a wireless receiver 172 and an antenna 173. Optionally the mobile printing apparatus 200 can also include a wireless transmitter (not shown). In addition to control instructions, data for printing can also be provided wirelessly to the mobile printing apparatus 200. Alternatively, data for printing can be provided through a data input port 174, such as a USB port or a memory card slot.

Figure 5:
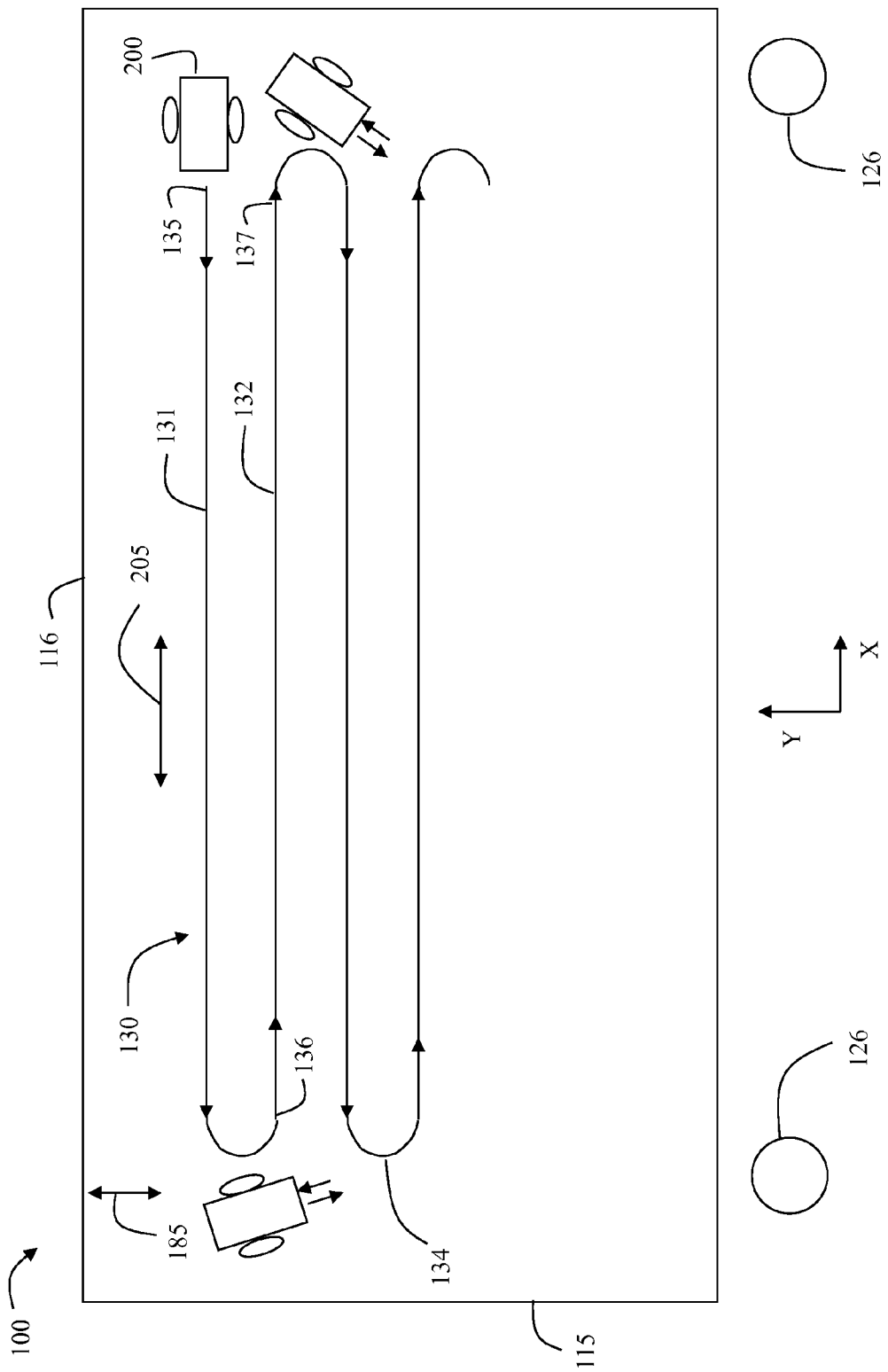
FIG. 5 schematically shows the mobile printing apparatus travelling in a serpentine pattern for printing multiple adjacent swaths.

Having described embodiments of the mobile printing system 100 including the mobile printing apparatus 200, a context is provided for describing methods of operation. FIG. 5 shows the mobile printing apparatus 200 of the mobile printing system 100 (similar to that described in U.S. patent application Ser. No. 13/686,986, filed Nov. 28, 2012) traveling in a serpentine pattern 130 of a type that that can be used for printing an image on a sheet of the medium 115 in multiple adjacent swaths, for example. The serpentine pattern 130 includes straight portions in a first direction 131 that are parallel to straight portions in a second direction 132 that is opposite to the first direction. Straight portions in the first direction 131 are joined to straight portions in the second direction 132 by turn-around portions 134 in which the mobile printing apparatus 200 is rotated 180 degrees by moving it around a semicircle or other curved path. The initial swath (corresponding to the topmost straight portion 131) can be properly located on the sheet of the medium 115 by moving the mobile printing apparatus 200 until a top edge 116 of sheet of medium 115 is detected by the photosensor array 191 or 192, by observing a position at which a high signal (corresponding to light received from the white sheet of the medium 115) is adjacent to a low signal (corresponding to light from the surface that supports the sheet of the medium 115). Then the controller 170 can instruct the mobile printing apparatus 200 to move to an initial starting position 135 relative to the top edge 116 (according to image data) at an end of the topmost straight portion 131, as shown in FIG. 5. The initial heading for moving along straight portion in the first direction 131 can be made to be parallel to the top edge 116.

During printing, the mobile printing apparatus 200 moves along a scan direction 205, corresponding to straight portions in the first and second directions 131 and 132, and the marking element array 186 is oriented such that the array direction 185 is perpendicular to or substantially perpendicular to a scan direction 205. Moving along the scan direction 205 for printing includes rotating both the first wheel 151 (FIG. 1) and the second wheel 152 in the same direction while they are in contact with the sheet of the medium 115 that is being printed on. The scan direction 205 can be along an X direction and the array direction 185 can be along a Y direction when the mobile printing apparatus 200 moves along the scan direction 205. A first swath of data is provided to the controller 170 of the mobile printing apparatus 200, either via the wireless receiver 172 or the data input port 174 for example (FIG. 1). The mobile printing apparatus 200 is moved from its initial starting position 135 along the scan direction 205 along straight portion in the first direction 131 while printing a first printed swath 211 (FIG. 6) corresponding to the first swath of data. A second swath of data is provided to the controller 170. The mobile printing apparatus 200 is moved to a second swath starting location 136, for example by following the turn-around portion 134, as the first wheel 151 (FIG. 1) is rotated in a first direction and the second wheel 152 is rotated in an opposite direction, or alternatively as the first and second wheels 151 and 152 are rotated in the same direction at different speeds. The mobile printing apparatus 200 is moved from the second swath starting location 136 along the scan direction 205 along straight portion in the second direction 132, opposite straight line portion in the first direction 131, while printing a second printed swath 212 (FIG. 7) corresponding to the second swath of data. As seen by comparing FIGS. 6 and 7, if the photosensor array 191 was in a lead position ahead of the marking element array 186 while printing the first printed swath 211, after following the turn-around portion 134, the photosensor array 191 will still be in a lead position ahead of the marking element array 186 while printing the second printed swath 212. It follows that for this type of serpentine printing, the array of marking elements 186 (FIG. 3) that is closest to the photosensor array 191 will always be the first array to print. For color printing this is advantageous because it indicates that color printing order is preserved in both swath directions. As is known, printing yellow ink on top of cyan ink can have a different appearance than printing cyan ink on top of yellow ink. Preserving color printing order can help to prevent color banding effects between adjacent swaths.

Figure 6:
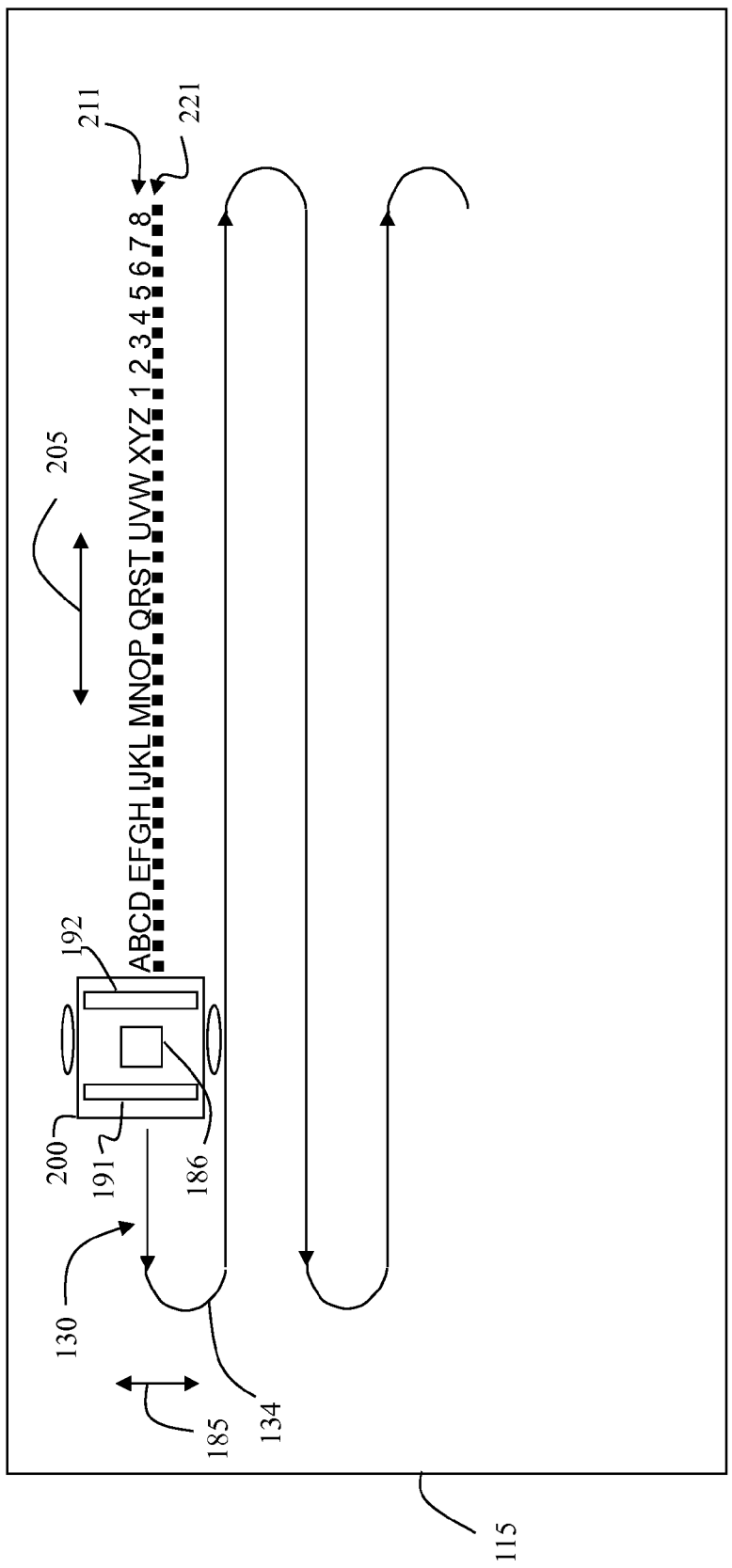
FIG. 6 shows the mobile printing apparatus as it prints a first printed swath and a first set of position reference marks.
Figure 7:
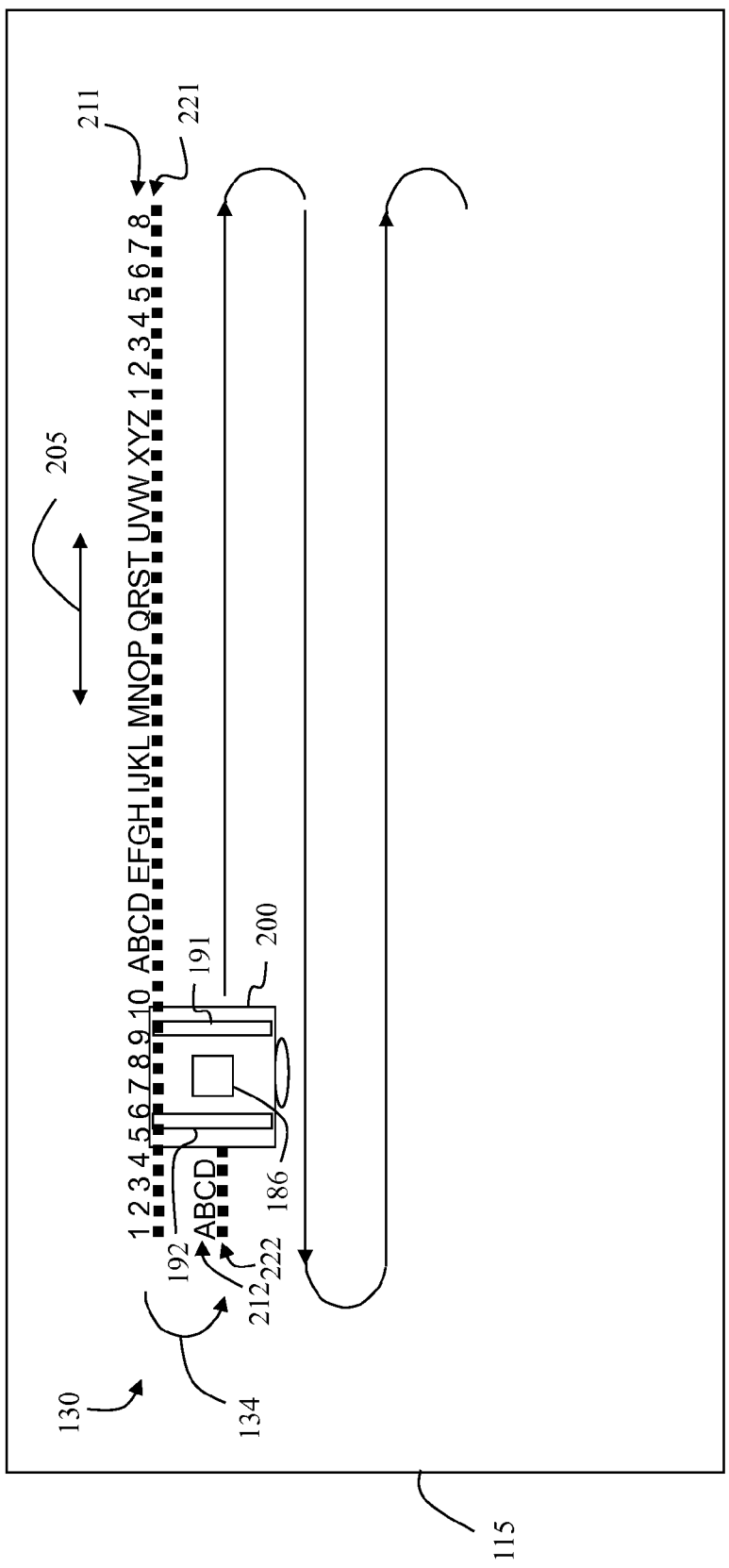
FIG. 7 shows the mobile printing apparatus as it prints a second printed swath and a second set of position reference marks, being guided at least in part by the first set of position reference marks.
Figure 8:
FIG. 8 shows an irregular pattern of position reference marks.

When printing bidirectionally in a serpentine pattern as shown in FIGS. 6 and 7, moving the mobile printing apparatus 200 to second swath starting location 136 includes moving mobile printing apparatus 200 to a location that is displaced from the initial starting position 135 along the scan direction 205. In addition, at the second swath starting location 136, the array of marking elements 186 is displaced from a location of the first printed swath 211 along a direction that is parallel to array direction 185. Alternatively, the mobile printing apparatus 200 can be moved in the serpentine pattern, but only print unidirectionally, for example only as it moves from right to left. In a unidirectional print mode, the mobile printing apparatus 200 is moved to an alternate second swath starting location 137 (FIG. 5) that is adjacent the initial starting position 135 prior to printing a second swath in the same direction as the first swath. In such a unidirectional print mode, it is preferable that the orientation of the mobile printing apparatus 200 at the alternate second swath starting location 137 be the same as its orientation at the initial starting position 135 in order to preserve color printing order.

The controller 170 (FIG. 1) can keep track of position and heading for the cumulative moves of the mobile printing apparatus 200 based on monitoring the rotary encoders 157 for the first wheel 151 and the second wheel 152. However, due to factors such as wheel slippage there will be some amount of error in the (X,Y) position as well as the heading of the mobile printing apparatus 200. Typically, additional error will be accumulated at every turn in the serpentine pattern 130. As a result, straight portions in the first direction 131 and straight portions in the second direction 132 will not be truly parallel to each other as needed for accurate positioning of the mobile printing apparatus 200. However, known positions of the reflective cylinders 126, for example, can be used to correct the current errors in heading and (X,Y) position of the mobile printing apparatus 200, as indicated in co-pending U.S. Ser. No. 13/686,986, filed Nov. 12, 2012. For example, as the mobile printing apparatus 200 is rotating in the turn-around portions 134, the hollow tube 161 with the photo detector 160 (see FIG. 1) is also being swept through a range of orientations so that it can detect signals due to reflected laser light from the reflective cylinders 126. In particular while moving along the serpentine pattern 130, the mobile printing apparatus 200 is moved by a known distance along straight portion in the first direction 131. Then the mobile printing apparatus 200 is rotated 180 degrees as it moves around a curved path while detecting an amplitude of light signal from at the least two reflective cylinders 126 as a function of the amount of rotation. The position and heading of the mobile printing apparatus 200 can thereby be recalibrated, comparing position and heading data stored in the controller 170 to the measurements relative to the reflective cylinders 126, prior to moving mobile printing apparatus 200 along the straight portion in the second direction 132. Errors in Y are corrected by changing the radius of the next turn by controlling the motors 155 to appropriately adjust the speed and direction of the first wheel 151 and the second wheel 152. Heading error is corrected by changing the angle of the next turn by controlling the duration of the motors 155 moving mobile printing apparatus 200 substantially in a semicircle. Error in X (that is, the position at which a particular operation occurs) are corrected by changing the starting position of the operation for that swath, as well as the length of move during which the operation occurs along the swath.

As indicated above, for some types of position referenced mobile printing systems 100, accuracy can be limited to a few thousandths of an inch. This is good enough for moving the mobile printing apparatus 200 from a first portion of an image to a second portion that is separated from the first portion by a white space, but is not sufficiently accurate for high quality printing of some types of multipass images or other items that are printed using multiple adjacent passes. For desktop carriage inkjet printers, a linear encoder strip (not shown) is conventionally provided across the printing region of the printer. The linear encoder strip has dark lines alternating with transparent lines that serve as position references for when to eject drops as the carriage moves back and forth along a carriage scan direction across the printing region. For the configuration of a mobile printing system 100, there is no place to put a linear encoder strip, since the mobile printing apparatus 200 moves not only in the X direction but also in the Y direction.

FIGS. 6 and 7 show how adjacent printed swaths can be positioned relative to one another with high accuracy in an embodiment of the present invention. With reference also to FIG. 3, the first printed swath 211 is printed using a first portion of the array of marking elements 186 (the first portion corresponding to the nozzles 188 that are closer to the top edge 116 of sheet of the medium 115) while moving the mobile printing apparatus 200 along the scan direction 205. In addition, a first set of position reference marks 221 are printed using a second portion of the array of marking elements 186 (the second portion corresponding to nozzles 188 that are farther from the top edge 116) while moving the mobile printing apparatus 200 along the scan direction 205. Then, as shown in FIG. 7, as the mobile printing apparatus 200 is moved along the scan direction 205 to print the second printed swath 212, the photosensor array that is in the leading position (i.e. first photosensor array 191 in FIG. 7) is used to sense the first set of position reference marks 221. A reason for the first photosensor array 191 being longer than the marking element array 186, and preferably about three times as long as the marking element array 186 is so that the first photosensor array 191 can sense the first set of position reference marks 221 while the marking element array 186 is in position to print the second printed swath 212. In subsequent swaths, photo sensing elements from the upper portion and the lower portion of the first photosensor array 191 are used to sense position reference marks from the previous swath as the mobile printing apparatus 200 is turned in different orientations.

As the second printed swath 212 is printed, operation of the mobile printing apparatus 200 for printing the second printed swath 212 is guided, at least in part, by the first set of position reference marks 221. Operation here can include the timing of firing of the inkjet nozzles 188 for the second printed swath 212. Operation can also include fine adjustment of the heading of mobile printing apparatus 200 while printing the second printed swath 212. The heading can be changed by rotating the first wheel 151 and the second wheel 152 in the same direction but at slightly different speeds. Since the marking element arrays 186 are typically fabricated using high accuracy photolithography, the nozzles 188 in the marking element array 186 are at known positions relative to each other, so the position of the first set of reference marks 221 relative to the first printed swath 211 can be very accurately controlled. Since the second printed swath 212 is printed while guided at least in part by the first set of reference marks 221, the second printed swath 212 will be very accurately aligned relative to the first printed swath 211. In the same way (FIG. 7), a second set of position reference marks 222 is printed relative to the second printed swath 212 to serve as a reference for the third printed swath (not shown). It is not necessary that the second set of reference marks 222 be printed during the entire time that the second printed swath 212 is being printed, but it can be said that the second set of position reference marks 222 are printed after moving mobile printing apparatus 200 to the second swath starting location 136. Each subsequent printed swath is referenced to a set of reference marks printed during a preceding pass. In some embodiments, if an image is composed entirely of adjacent printing swaths, motion of mobile printing apparatus 200 can be guided entirely by printed reference marks without reference to local position references outside the printing region 112, such as the reflective cylinders 126 (FIG. 5).

In looking at FIGS. 6 and 7, a problem that clearly needs to be addressed is how to make the position reference marks, such as the first set of position reference marks 221 so that they have no deleterious effect on the printed object but still be detectable by the first or second photosensor array 191 or 192. For printing an image without the position reference marks causing a deleterious effect on image quality, it is desirable to print the position reference marks by depositing a marking material that is difficult for a human eye to perceive. Of the printing inks for color printing (cyan, magenta, yellow and black), yellow is the color that is least perceptible to the human eye, so one way to make the reference marks less noticeable is to deposit a yellow marking material for the position reference marks. Secondly, although for clarity in FIGS. 6 and 7 the features of the first set and second set of position reference marks 221 and 222 are shown as roughly the same size as the characters in the first and second printed swaths 211 and 212, in actuality, the feature size of position reference marks can be much smaller. Position reference marks can be made by depositing the marking material with a feature width of greater than 10 microns but less than 50 microns to make them perceptible to a photosensor array but less noticeable to the human eye. Thirdly, the human eye is more sensitive to uniformly repeating patterns. Rather than having a set of reference position markers that are deposited at uniform spacing along a straight line, the marking material for the reference position markers can be deposited in a predetermined nonlinear irregular pattern 225. The irregular pattern 225 can have irregular spacing of the marks along both X and Y, as shown in FIG. 7. As long as the controller 170 knows what the irregular pattern 225 is, the irregular pattern 225 can provide reference positioning for an adjacent swath.

Figure 9:
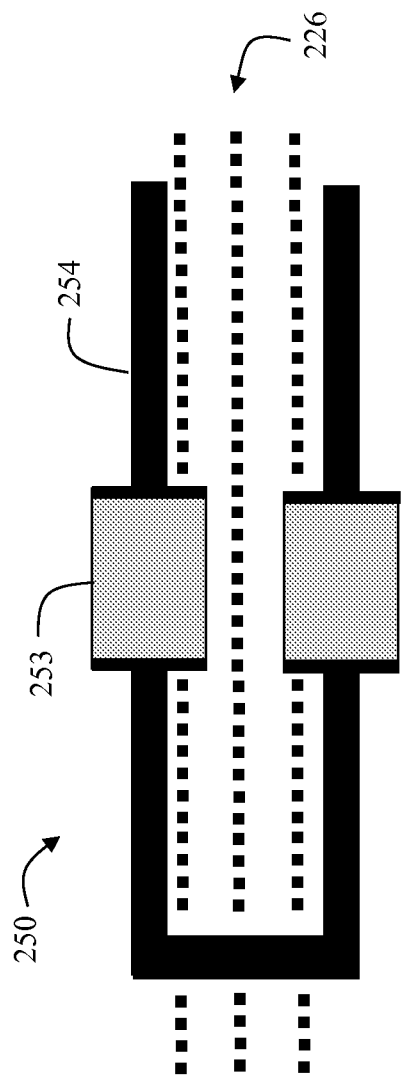
FIG. 9 shows a functional device being printed with respect to printed reference marks.

For printing a functional device using position reference marks without the position reference marks causing a deleterious effect on the device, perceptibility to the human eye is not as important. Rather, the position reference marks should not affect device performance. A simple example is shown in FIG. 9 where the functional device 250 is a portion of an electrical circuit having two resistors 253 that are joined by conductive leads 254. In this example, three sets of position reference marks 226 are shown. In each set, the marking material for position reference marks 226 is deposited in positions that do not contact the functional device 250 that is formed.

Figure 10:
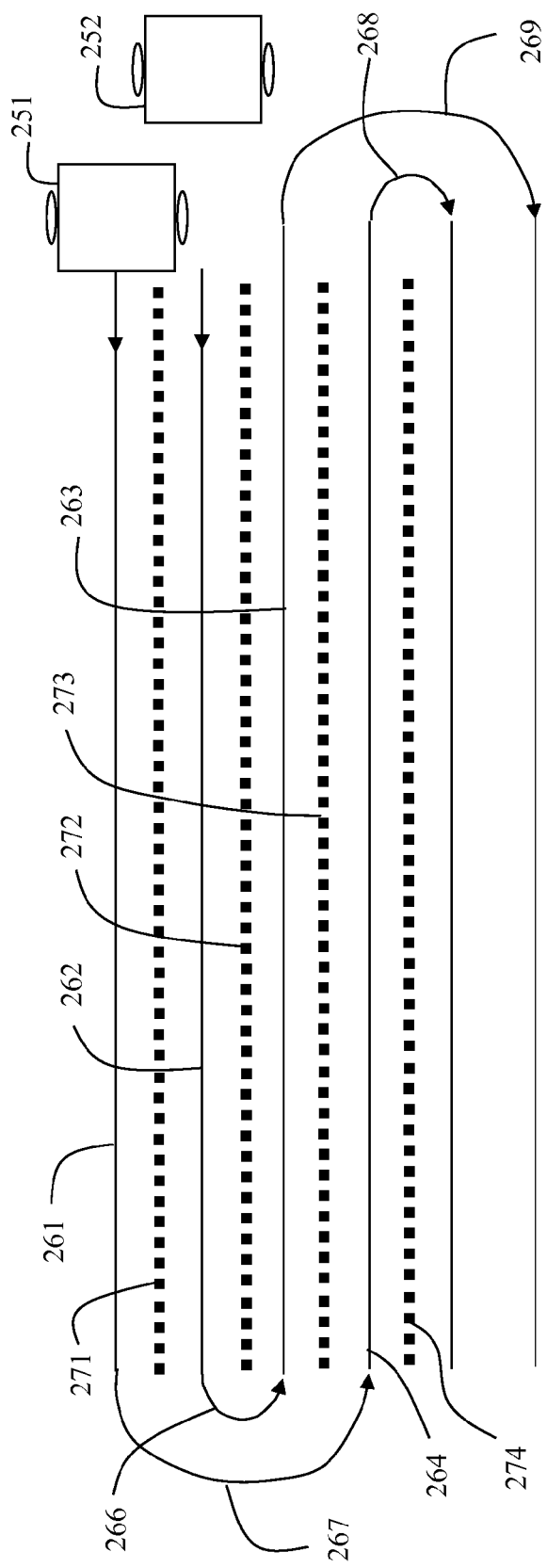
FIG. 10 shows two mobile printing apparatuses working together to print swaths and position reference marks.

In the examples above, the image or device was printed using a single mobile printing apparatus 200. Because of the accurate position control that is provided, images or devices can optionally be printed using a plurality of mobile printing apparatuses. FIG. 10 schematically shows printing of several adjacent passes using a first mobile printing apparatus 251 and a second mobile printing apparatus 252. The first and second mobile printing apparatuses 251 and 252 move in a pair of nested serpentine patterns. In the example shown in FIG. 9, the first mobile printing apparatus 251 leads the way going right to left and prints the first printed swath 261 as well as the first set of printed reference marks 271. The second mobile printing apparatus 252 follows going right to left and prints the second printed swath 262 as well as the second set of printed reference marks 272 with the operation of the second mobile printing apparatus 252 being guided, at least in part, by the first set of printed reference marks 261 that were printed by the first mobile printing apparatus 251. At the end of travel on the left, the second mobile printing apparatus 252 follows an inner turn-around path 266, and the first mobile printing apparatus 251 follows an outer turn-around path 267. During the next left to right pass, the second mobile printing apparatus 252 leads the way and prints a third printed swath 263 as well as a third set of printed reference marks 273 with the operation of the second mobile printing apparatus 252 being guided, at least in part, by the second set of printed reference marks 262 that were printed by the second mobile printing apparatus 252. The first mobile printing apparatus 251 follows going left to right and prints a fourth printed swath 264 as well as a fourth set of position reference marks 274 with the operation of the first mobile printing apparatus 251 being guided, at least in part, by the third set of printed reference marks 263 that were printed by the second mobile printing apparatus 252. At the end of travel on the right, the first mobile printing apparatus 251 follows an inner turn-around path 268 and the second mobile printing apparatus 252 follows an outer turn-around path 269. The process is repeated for subsequent printing passes.

The present invention has been described in detail with particular reference to certain preferred embodiments thereof, but it will be understood that variations and modifications can be effected within the scope of the invention.

PARTS LIST

100 Position-referenced mobile system
101 Cap-raising direction
102 Cap-lowering direction
103 Entry direction
104 Exit direction
105 Home base
106 Charger
107 Cap
108 Liquid refill station
110 Position detection region
112 Printing region
115 Sheet of medium
116 Top edge
121 Reflective element
122 Reflective element
123 Reflective element
125 Cylindrical surface
126 Reflective cylinder(s)
130 Serpentine pattern
131 Straight portion in first direction
132 Straight portion in second direction
134 Turn-around portion
135 Initial starting position
136 Second swath starting location
137 Alternate second swath starting location
140 Mobile apparatus
141 First edge
142 Second edge
143 Chassis
145 First rotational direction (forward)
146 Top edge
147 Second rotational direction
151 First wheel
152 Second wheel
153 Ball or caster wheel
154 Hub
155 Motor
156 Shaft
157 Rotary encoder
158 Radial line(s)
159 Elongated line
160 Photo detector
161 Hollow tube
162 Laser
163 Cylindrical package
167 Motor gear
168 Wheel gear
170 Controller
171 Liquid supply
172 Wireless receiver
173 Antenna
174 Data input port
175 Power source
182 Printhead
184 Printhead die
185 Array direction
186 Array of marking elements
188 Nozzle
190 Direction
191 First photosensor array
192 Second photosensor array
195 First printing direction
200 Mobile printing apparatus
205 Scan direction
211 First printed swath
212 Second printed swath
221 First set of position reference marks
222 Second set of position reference marks
225 Irregular pattern
226 Position reference marks
250 Functional device
251 first mobile printing apparatus
252 second mobile printing apparatus
253 Resistor
254 Conductive lead
261 First printed swath
262 Second printed swath
263 Third printed swath
264 Fourth printed swath
266 Inner turn-around path
267 Outer turn-around path
268 Inner turn-around path
269 Outer turn-around path
271 First set of position reference marks
272 Second set of position reference marks
273 Third set of position reference marks
274 Fourth set of position reference marks
280 Docking station
281 Hinge
282 Ramp
283 Pump
284 Flexible tubing
285 Rotatable element
286 Idler
287 Motor
288 Display
289 Stop portion
290 Replenishment station
291 Flexible link
292 Connector
293 Projection

The invention claimed is:

1. A method of printing with a mobile printing apparatus having an array of marking elements disposed along an array direction, the method comprising:
    moving the mobile printing apparatus to an initial starting position;
    providing a first swath of data;
    printing a first printed swath corresponding to the first swath of data using a first portion of the array of marking elements while moving the mobile printing apparatus along a scan direction;

printing a first set of position reference marks using a second portion of the array of marking elements while moving the mobile printing apparatus along the scan direction;

providing a second swath of data;

sensing the first set of position reference marks; and printing a second printed swath corresponding to the second swath of data, wherein operation of the mobile printing apparatus for printing the second printed swath is guided, at least in part, by the first set of position reference marks.

2. The method according to claim 1 further comprising moving the mobile printing apparatus to a second swath starting location before printing the second printed swath, such that the array of marking elements is displaced from a location of the first printed swath along a direction that is parallel to the array direction.

3. The method according to claim 2, wherein the step of moving the mobile printing apparatus to a second swath starting location includes moving the mobile printing apparatus to a location that is adjacent the initial starting position.

4. The method according to claim 2, wherein the step of moving the mobile printing apparatus to a second swath starting location includes moving the mobile printing apparatus to a location that is displaced from the initial starting position along the scan direction.

5. The method according to claim 4, wherein the step of printing the second printed swath includes moving the mobile printing apparatus in a direction opposite the scan direction along which the mobile printing apparatus moved while printing the first printed swath.

6. The method according to claim 4, wherein the step of moving the mobile printing apparatus to a second swath starting location includes:

rotating a first wheel of the mobile printing apparatus in a first direction; and rotating a second wheel of the printing apparatus in a second direction opposite the first direction to turn the mobile printing apparatus around.

7. The method according to claim 1 further comprising printing a second set of position reference marks after moving the mobile printing apparatus to the second swath starting location.

8. The method according to claim 1, wherein the step of printing a first printed swath includes rotating a first wheel and a second wheel in a first direction while they are in contact with a sheet of medium that is being printed on.

9. The method according to claim 1, wherein printing the first set of position reference marks includes depositing a marking material that is difficult for a human eye to perceive.

10. The method according to claim 9, wherein the marking material is yellow.

11. The method according to claim 9, wherein the marking material is deposited in a nonlinear pattern.

12. The method according to claim 9, wherein a feature width of the deposited marking material is greater than 10 microns and less than 50 microns.

13. The method according to claim 1, wherein the array of marking elements includes an array of nozzles and wherein printing the first printed swath includes ejecting drops through the nozzles.

14. The method according to claim 13, wherein the printing of the first printed swath includes ejecting drops of colored ink to form a portion of an image.

15. The method according to claim 13, wherein the printing of the first printed swath includes ejecting drops of a functional material to form a portion of a device.

16. The method according to claim 15, wherein printing the first set of position reference marks includes depositing a marking material in a plurality of positions that do not contact the device that is formed.

17. The method according to claim 1, the mobile printing apparatus being the first of a plurality of mobile printing apparatuses, the method further comprising printing a second set of position reference marks, wherein the steps of printing the second printed swath and printing the second set of position reference marks are done using a second mobile printing apparatus of the plurality of mobile printing apparatuses.

18. The method according to claim 17 further comprising:

providing a third swath of data;

printing a third printed swath corresponding to the third swath of data using the second mobile printing apparatus, wherein operation of the second mobile printing apparatus for printing the third printed swath is guided, at least in part, by the second set of position reference marks; and printing a third set of position reference marks using the second mobile printing apparatus.

19. The method according to claim 18 further comprising:

providing a fourth swath of data;

printing a fourth printed swath corresponding to the fourth swath of data using the first mobile printing apparatus, wherein operation of the first mobile printing apparatus for printing the fourth printed swath is guided, at least in part, by the third set of position reference marks; and printing a fourth set of position reference marks using the first mobile printing apparatus.

* * * * *